US010750480B2

(12) United States Patent
Fukuta (10) Patent No.: US 10,750,480 B2
(45) Date of Patent: *Aug. 18, 2020

(54) MOBILE COMMUNICATION SYSTEM, USER TERMINAL, BASE STATION, PROCESSOR, AND COMMUNICATION CONTROL METHOD

(71) Applicant: KYOCERA CORPORATION, Kyoto (JP)

(72) Inventor: Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 30 days.

This patent is subject to a terminal disclaimer.

(21) Appl. No.: 16/202,459

(22) Filed: Nov. 28, 2018

(65) Prior Publication Data

US 2019/0098616 A1    Mar. 28, 2019

Related U.S. Application Data

(63) Continuation of application No. 14/439,008, filed as application No. PCT/JP2013/077816 on Oct. 11, 2013, now Pat. No. 10,165,604.

(Continued)

(51) Int. Cl.
*H04W 72/04* (2009.01)
*H04L 12/24* (2006.01)
(Continued)

(52) U.S. Cl.
CPC ..... *H04W 72/0406* (2013.01); *H04L 41/0803* (2013.01); *H04W 48/08* (2013.01);
(Continued)

(58) Field of Classification Search
None
See application file for complete search history.

(56) References Cited

U.S. PATENT DOCUMENTS 8,498,237 B2   7/2013   Corson et al.
8,804,677 B2   8/2014   Corson et al.
(Continued)

FOREIGN PATENT DOCUMENTS

JP   2003-032724 A   1/2003
JP   2009-523387 A   6/2009
(Continued)

OTHER PUBLICATIONS

International Search Report; PCT/JP2013/077816; dated Dec. 10, 2013.
(Continued)

*Primary Examiner* — Adnan Baig
(74) *Attorney, Agent, or Firm* — Studebaker & Brackett PC (57) ABSTRACT

A mobile communication system includes a base station that configures a plurality of cells. The plurality of cells include D2D supporting cell that supports D2D communication in which data communication is directly performed between terminals and D2D non-supporting cell that does not support the D2D communication. The base station transmits D2D information indicating that the D2D communication is permitted in the base station. Based on a measurement report received from a user equipment, the base station is further configured to perform handover of the user equipment from the D2D non-supporting cell to the D2D supporting cell, after receiving notification information from the user equipment indicating an interest in performing the D2D communication by the user terminal.

6 Claims, 10 Drawing Sheets

Related U.S. Application Data (60) Provisional application No. 61/719,612, filed on Oct. 29, 2012.

(51) Int. Cl.
*H04W 68/00* (2009.01)
*H04W 48/08* (2009.01)
*H04W 76/14* (2018.01)
*H04W 88/02* (2009.01)
*H04W 88/08* (2009.01)
*H04W 92/18* (2009.01)

(52) U.S. Cl.
CPC ......... *H04W 68/005* (2013.01); *H04W 76/14* (2018.02); *H04W 88/02* (2013.01); *H04W 88/08* (2013.01); *H04W 92/18* (2013.01)

(56) References Cited

U.S. PATENT DOCUMENTS

| | | | |
|---|---|---|---|
| 9,320,067 B2 | 4/2016 | Ho et al. | |
| 9,414,268 B2 | 8/2016 | Fodor et al. | |
| 2003/0016642 A1 | 1/2003 | Nakayasu | |
| 2007/0286111 A1 | 12/2007 | Corson et al. | |
| 2009/0092075 A1 | 4/2009 | Corson et al. | |
| 2011/0228666 A1 | 9/2011 | Barbieri et al. | |
| 2012/0213183 A1* | 8/2012 | Chen ................ | H04W 72/1278 370/329 |
| 2013/0210447 A1 | 8/2013 | Moe et al. | |
| 2013/0308598 A1 | 11/2013 | Madan et al. | |
| 2014/0274066 A1* | 9/2014 | Fodor ................... | H04W 36/08 455/437 |
| 2015/0249937 A1 | 9/2015 | Lindoff et al. | |

FOREIGN PATENT DOCUMENTS

| | | |
|---|---|---|
| JP | 2011-250173 A | 12/2011 |
| JP | 2013-523018 A | 6/2013 |
| JP | 2014-504814 A | 2/2014 |
| JP | 2014-532372 A | 12/2014 |
| WO | 2011/051745 A1 | 5/2011 |
| WO | 2011/116017 A1 | 9/2011 |
| WO | 2012/053952 A1 | 4/2012 |
| WO | 2012/088470 A1 | 6/2012 |
| WO | 2013/055271 A1 | 4/2013 |
| WO | 2015/009131 A1 | 1/2015 |

OTHER PUBLICATIONS

3GPP TR 22.803 V0.3.0 (May 2012); 3rd Generation Partnership Project; Technical Specification Group SA; Feasibility Study for Proximity Services (ProSe)(Release 12).

The extended European search report issued by the European Patent Office dated May 24, 2016, which corresponds to European Patent Application No. 13852248.7-1505 and is related to U.S. Appl. No. 14/439,008.

An Office Action; "Notice of Reasons for Rejection," issued by the Japanese Patent Office dated Jun. 28, 2016, which corresponds to Japanese Patent Application No. 2014-541114 and is related to U.S. Appl. No. 14/439,008; with English language statement of relevance.

\* cited by examiner

MOBILE COMMUNICATION SYSTEM, USER TERMINAL, BASE STATION, PROCESSOR, AND COMMUNICATION CONTROL METHOD

CROSS-REFERENCE TO RELATED APPLICATIONS

This application is a Continuation of U.S. application Ser. No. 14/439,008 filed Apr. 28, 2015, which is the U.S. National Phase of International Application No. PCT/JP2013/077816 filed Oct. 11, 2013, which claims the benefit of U.S. Provisional Application No. 61/719,612 filed on Oct. 29, 2012, the entire contents of which are incorporated herein by reference.

TECHNICAL FIELD

The present disclosure relates to a mobile communication system that supports D2D communication.

BACKGROUND ART

In a 3GPP (3rd Generation Partnership Project) which is a project aiming to standardize a mobile communication system, the introduction of Device to Device (D2D) communication is discussed as a new function after Release 12 (see non patent document 1).

In the D2D communication, a plurality of adjacent user terminals directly perform data communication in a frequency band assigned to the mobile communication system. It is noted that the D2D communication is also called Proximity Service communication.

CITATION LIST

Non-Patent Literature

Non-Patent Document 1: 3GPP technical report "TR 22.803 V0.3.0" May 2012.

SUMMARY

In the current state, there is no designed specification for appropriately controlling D2D communication.

Therefore, the present disclosure provides a mobile communication system capable of appropriately controlling D2D communication, a user terminal, a base station, a processor and a mobile communication method thereof.

A mobile communication system according to the present disclosure comprises a plurality of cells, which include a device-to-device (D2D) supporting cell that supports D2D communication in which data communication is directly performed between user equipments, a D2D non-supporting cell that does not support the D2D communication, the D2D supporting cell and the D2D non-supporting cell conforming with long term evolution (LTE) standards and supporting LTE cellular communication, and at least one base station configured to include the D2D non-supporting cell and the D2D supporting cell. A user equipment is configured to receive a system information block (SIB) from the D2D non-supporting cell not assigning radio resources for the D2D communication, the SIB indicating that the D2D communication to be performed by the user equipment is permitted in the at least one base station, and transmit notification information to the at least one base station in response to receiving the SIB from the D2D non-supporting cell, the notification information indicating an interest in performing the D2D communication by the user equipment. In a case that the user equipment is in an idle state, the user equipment is configured to transition to a connected state to transmit the notification information in response to receiving the SIB from the D2D non-supporting cell. The user equipment is configured to transmit a measurement report to the at least one base station, and the at least one base station is further configured to perform handover of the user equipment from the D2D non-supporting cell to the D2D supporting cell, based on the measurement report, after receiving the notification information from the user equipment.

A base station for a mobile communication system according to the present disclosure includes a plurality of cells, which include a device-to-device (D2D) supporting cell that supports D2D communication in which data communication is directly performed between user terminals, and a D2D non-supporting cell that does not support the D2D communication, the D2D supporting cell and the D2D non-supporting cell conforming with long term evolution (LTE) standards. The base station comprises a control unit configured to include the D2D non-supporting cell, transmit a system information block (SIB) from the D2D non-supporting cell not assigning radio resources for the D2D communication, the SIB indicating that the D2D communication to be performed by a user terminal is permitted in the base station, receive notification information from the user terminal that transmits the notification information in response to receiving the SIB from the D2D non-supporting cell, where the notification information indicates an interest in performing the D2D communication by the user terminal, receive a measurement report from the user terminal, and perform handover of the user terminal from the D2D non-supporting cell to the D2D supporting cell, based on the measurement report, after receiving the notification information from the user terminal.

A processor for a user terminal for a mobile communication system according to the present disclosure includes a plurality of cells that include a device-to-device (D2D) supporting cell that supports D2D communication in which data communication is directly performed between user terminals, and a D2D non-supporting cell that does not support the D2D communication, the D2D supporting cell and the D2D non-supporting cell conforming with long term evolution (LTE) standards and supporting LTE cellular communication. The processor is configured to perform processes of receiving, from the D2D non-supporting cell of a base station not assigning radio resources for the D2D communication, a system information block (SIB), the SIB indicating that the D2D communication to be performed by the user terminal is permitted in the base station, and transmitting notification information to the base station in response to receiving the SIB from the D2D non-supporting cell, the notification information indicating an interest in performing the D2D communication by the user terminal. In a case that the user terminal is in an idle state, processor is configured to perform processes transitioning to a connected state to transmit the notification information in response to receiving the SIB from the D2D non-supporting cell. The processor is configured to perform processes transmitting a measurement report to the base station, and performing handover of the user terminal from the D2D non-supporting cell to the D2D supporting cell, based on an instruction from the base station.

DESCRIPTION OF THE EMBODIMENT

Overview of Embodiment

A mobile communication system according to an embodiment includes a base station configuring a plurality of cells. The plurality of cells include D2D supporting cell that supports D2D communication in which data communication is directly performed between terminals, and D2D non-supporting cell that does not support the D2D communication. The base station transmits D2D information, which indicates that the D2D communication is permitted even in the D2D non-supporting cell as well as the D2D supporting cell. In this way, a user terminal camping on the D2D non-supporting cell is also able to notify the base station of a desire for performing the D2D communication.

In the embodiment, the base station transmits the D2D information as a part of system information receivable in a user terminal in an idle state. In this way, a user terminal in the idle state is also able to notify the base station of a desire for performing the D2D communication.

In the embodiment, the mobile communication system further includes a user terminal that camps on one of the plurality of cells. When the D2D information is received, the user terminal recognizes that the D2D communication is possible under the control of the base station. In this way, the user terminal is able to notify the base station of a desire for performing the D2D communication, regardless of whether the user terminal camps on the D2D non-supporting cell, if the user terminal camps on a cell configured by a base station having the D2D supporting cell.

In the embodiment, when the user terminal receives the D2D information and desires the D2D communication, the user terminal transmits notification information indicating a desire for performing the D2D communication to the base station. In this way, a user terminal camping on the D2D non-supporting cell is also able to notify the base station of a desire for performing the D2D communication, so that the D2D communication is possible.

In the embodiment, the user terminal includes identification information of another user terminal, which is to be a communication partner of the user terminal in the D2D communication, into the notification information. In this way, the base station is able to identify the other user terminal and appropriately determine whether to allow the D2D communication to be performed.

Alternatively, the user terminal includes information, which indicates a radio resource that is assigned to another user terminal which is to be a communication partner of the user terminal in the D2D communication, and information, which indicates a cell on which the other user terminal camps, into the notification information. In this way, the base station is able to identify the other user terminal and appropriately determine whether to allow the D2D communication to be performed.

In the embodiment, when the user terminal is in a connection state in the D2D non-supporting cell, the base station performs handover of the user terminal to the D2D supporting cell on the basis of the reception of the notification information from the user terminal. In this way, the user terminal is able to perform the D2D communication in the D2D supporting cell.

A base station according to the embodiment configures a plurality of cells. The plurality of cells include D2D supporting cell that supports D2D communication in which data communication is directly performed between terminals and D2D non-supporting cell that does not support the D2D communication. The base station comprises: a control unit that transmits D2D information indicating that the D2D communication is permitted even in the D2D non-supporting cell as well as the D2D supporting cell.

A processor according to the embodiment is provided in a base station that configures a plurality of cells. The plurality of cells include D2D supporting cell that supports D2D communication in which data communication is directly performed between terminals and D2D non-supporting cell that does not support the D2D communication. The processor performs a process in which the base station transmits D2D information indicating that the D2D communication is permitted even in the D2D non-supporting cell as well as the D2D supporting cell.

A user terminal according to the embodiment camps on one of a plurality of cells in a mobile communication system that includes a base station configuring the plurality of cells. The plurality of cells include D2D supporting cell that supports D2D communication in which data communication is directly performed between terminals and D2D non-supporting cell that does not support the D2D communication. The user terminal comprises: a control unit that recognizes that the D2D communication is possible under the control of the base station, when D2D information is received in one of the plurality of cells. The D2D information includes information indicating that the D2D communication is permitted.

A processor according to the embodiment is provided in a user terminal that camps on one of a plurality of cells in a mobile communication system that includes a base station configuring the plurality of cells. The plurality of cells include D2D supporting cell that supports D2D communication in which data communication is directly performed between terminals and D2D non-supporting cell that does not support the D2D communication. The processor performs a process in which the user terminal recognizes that the D2D communication is possible under the control of the base station when D2D information is received in one of the plurality of cells. The D2D information includes information indicating that the D2D communication is permitted.

A communication control method according to the embodiment is used in a mobile communication system, which includes a base station configuring a plurality of cells. The plurality of cells include D2D supporting cell that supports D2D communication in which data communication is directly performed between terminals and D2D non-supporting cell that does not support the D2D communication. The communication control method comprises: a step of transmitting, by the base station, D2D information indicating that the D2D communication is permitted even in the D2D non-supporting cell as well as the D2D supporting cell.

Embodiment

Hereinafter, with reference to the accompanying drawings, description will be provided for an embodiment in which D2D communication is introduced to a mobile communication system (an LTE system) configured based on the 3GPP standards.

(LTE System)

Figure 1:
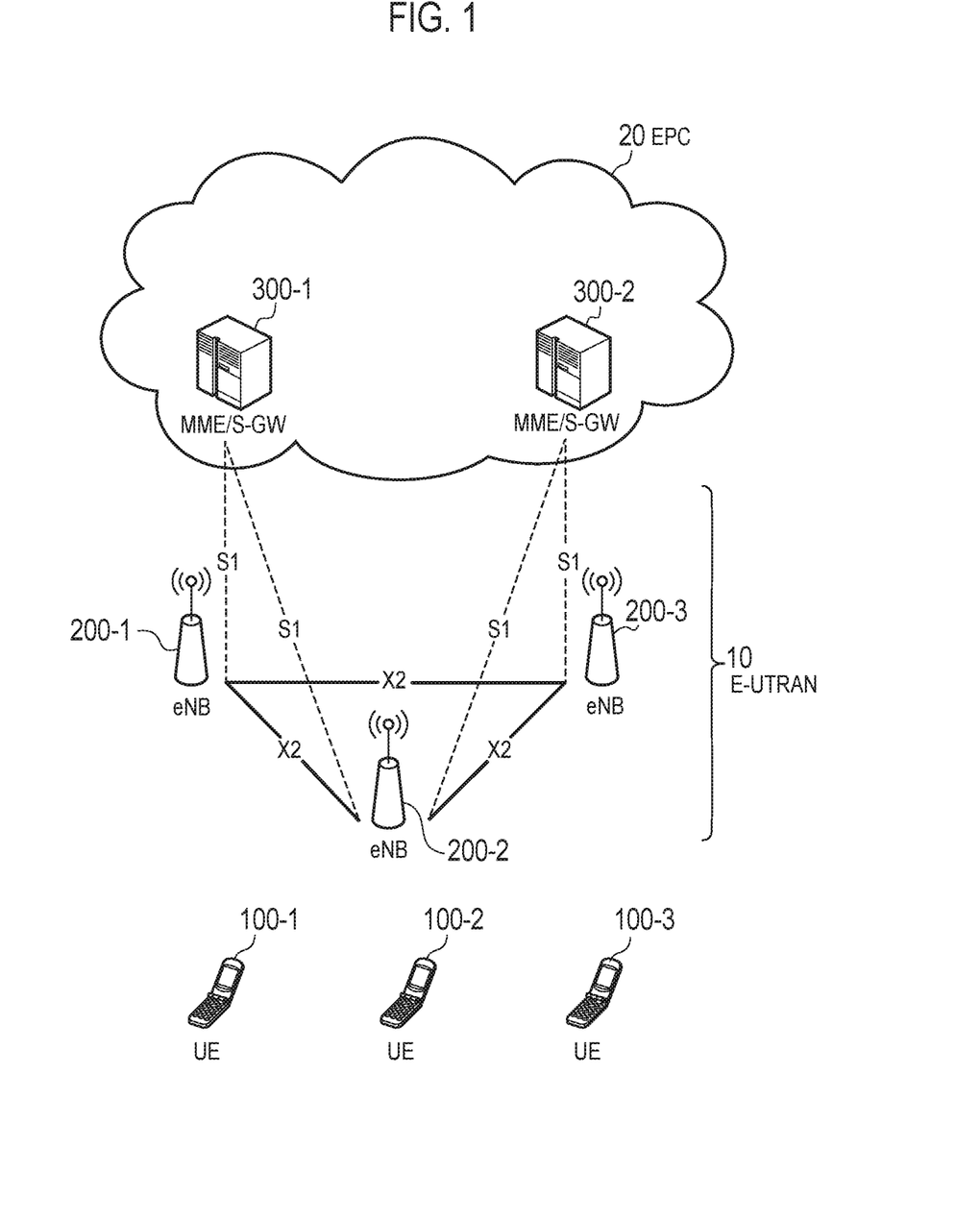
FIG. 1 is a configuration diagram of an LTE system.

FIG. 1 is a configuration diagram of the LTE system according to the present embodiment.

As illustrated in FIG. 1, the LTE system includes a plurality of UEs (User Equipments) 100, E-UTRAN (Evolved Universal Radio Access Network) 10, and EPC (Evolved Packet Core) 20. The EPC 20 corresponds to a core network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 configures one or a plurality of cells and performs radio communication with the UE 100 which establishes a connection with the cell of the eNB 200.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes a plurality of MME (Mobility Management Entity)/S-GWs (Serving-Gateways) 300.

The MME is a network node for performing various mobility controls, for example, for the UE 100 and corresponds to a controller. The S-GW is a network node that performs transfer control of user data and corresponds to a mobile switching center. The EPC 20 including the MME/S-GW 300 accommodates the eNB 200.

The eNBs 200 are connected mutually via an X2 interface. Furthermore, the eNB 200 is connected to the MME/S-GW 300 via an S1 interface.

Figure 2:
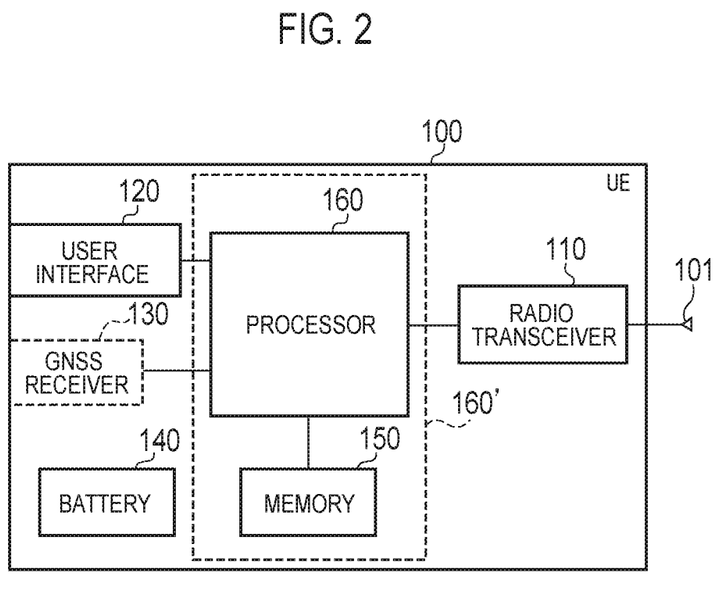
FIG. 2 is a block diagram of UE.
Figure 3:
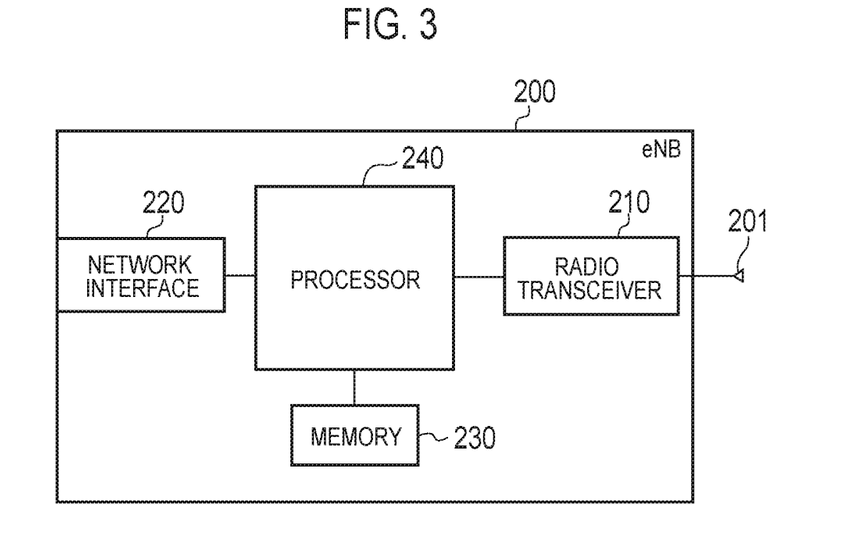
FIG. 3 is a block diagram of eNB.

Next, the configurations of the UE 100 and the eNB 200 will be described.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs coding and decoding of sound and video signals. The processor 160 implements various processes and various communication protocols described later.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. It is noted that the memory 230 may be integrally formed with the processor 240, and this set (that is, a chipset) may be called a processor.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
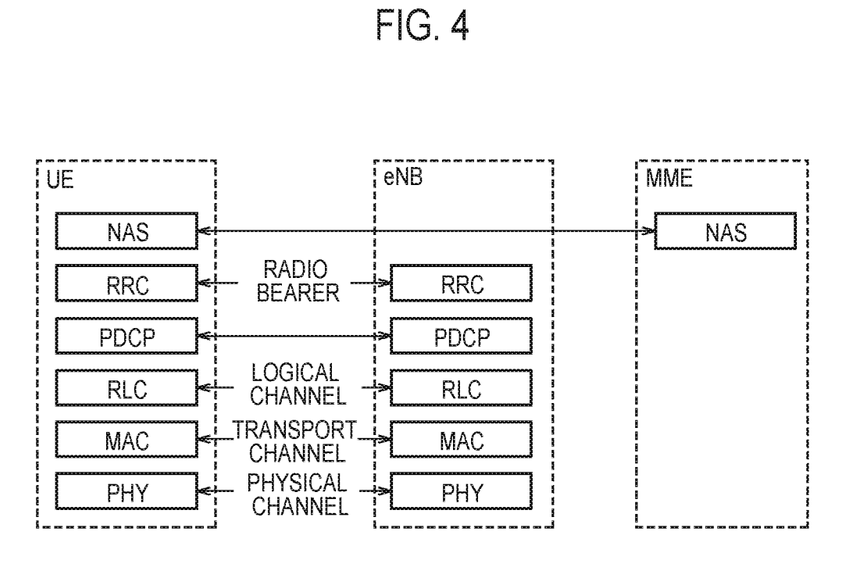
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (an HARQ). Between the MAC layer of the UE 100 and the MAC layer of the eNB 200, data is transmitted via a transport channel. The MAC layer of the eNB 200 includes a scheduler that determines an uplink and downlink transport format (a transport block size, a modulation and coding scheme and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connection state (RRC connected state), and when the RRC connection is not established, the UE 100 is in an idle state (RRC idle state).

A NAS (Non-Access Stratum) layer positioned above the RRC layer performs session management or mobility management, for example.

Figure 5:
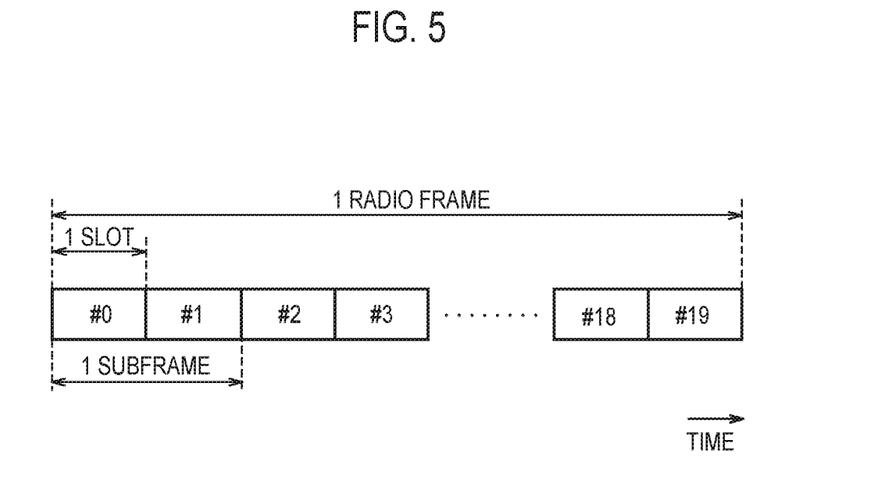
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction.

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the other interval of each subframe is a region mainly used as a physical downlink shared channel (PDSCH). Furthermore, in the downlink, reference signals such as cell-specific reference signals are distributed and arranged in each subframe.

In the uplink, both end portions in the frequency direction of each subframe are control regions mainly used as a physical uplink control channel (PUCCH). Furthermore, the center portion, in the frequency direction, of each subframe is a region mainly used as a physical uplink shared channel (PUSCH).

(D2D Communication)

The LTE system according to the present embodiment supports the D2D communication. Hereinafter, the D2D communication will be described in comparison with the normal communication (the cellular communication) of the LTE system.

In the cellular communication, the data path set between UEs passes through the EPC 20. On the other hand, in the D2D communication, the data path set between the UEs does not pass through the EPC 20. That is, in the D2D communication, UEs directly perform data communication.

Figure 6:
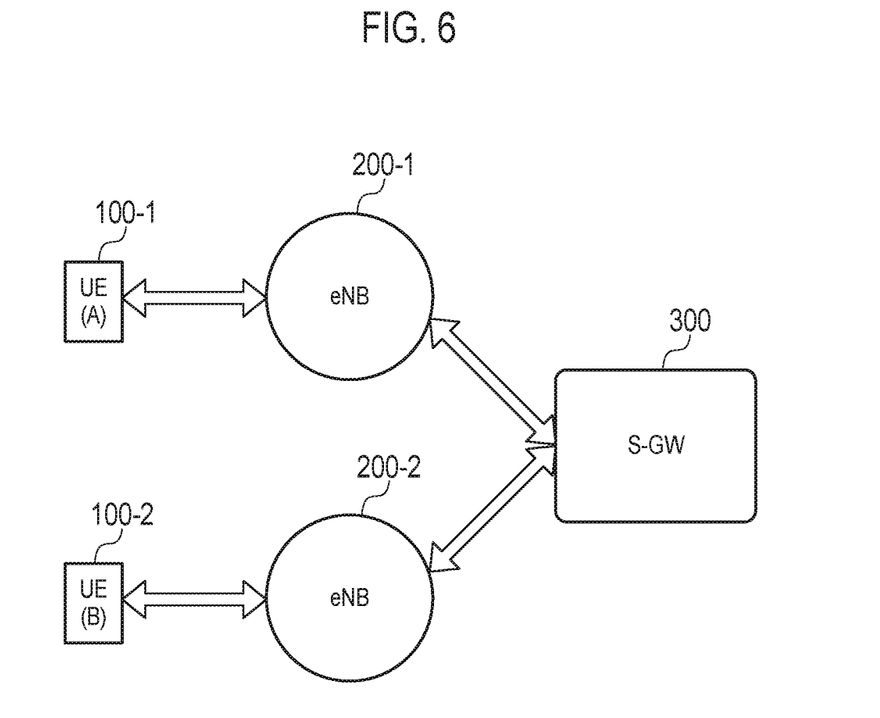
FIG. 6 is a diagram for explaining a data path in cellular communication.

FIG. 6 illustrates a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the EPC 20 (the S-GW 300). Specifically, the data path is set to pass through the eNB 200-1, the S-GW 300, and the eNB 200-2.

Figure 7:
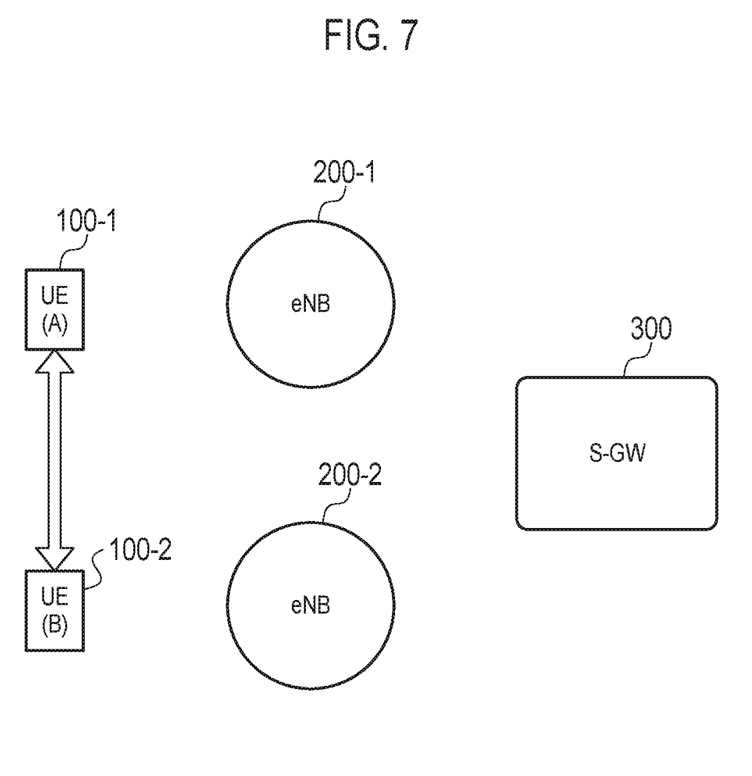
FIG. 7 is a diagram for explaining a data path in D2D communication.

FIG. 7 illustrates an example of the data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

As illustrated in FIG. 7, the data path of the D2D communication does not pass through the EPC 20 (the S-GW 300). In the D2D communication, two modes exist. One of them is a direct communication mode in which the data path does not pass through the eNB 200. FIG. 7 illustrates a case of the D2D communication in the direct communication mode. The other one of them is a local relay mode in which the data path passes through the eNB 200. The local relay mode is called a Locally Routed (L.R) mode.

As described above, when the UE 100-2 exists in the vicinity of the UE 100-1, the D2D communication is performed between the UE 100-1 and the UE 100-2, thereby obtaining an effect such as the reduction of a traffic load of the EPC 20 and a battery consumption amount of the UE 100.

It is noted that cases in which the D2D communication is started include (a) a case in which the D2D communication is started after a partner terminal is discovered by performing an operation for discovering a partner terminal, and (b) a case in which the D2D communication is started without performing an operation for discovering a partner terminal.

For example, in the above-described case (a), one UE 100 of the UE 100-1 and the UE 100-2 discovers the other UE 100 existing in the proximity of the one UE 100, so that the D2D communication is started.

In such a case, in order to discover the proximal terminal, the UE 100 has a (Discover) function of discovering another UE 100 existing in the proximity of the UE 100, and/or a (Discoverable) function of being discovered by another UE 100.

For example, one UE of the UE 100-1 and the UE 100-2 transmits a signal for discovery (Discover signal) to the vicinity of the one UE, and the other UE receives the signal for discovery, so that the other UE discovers the one UE. Furthermore, the other UE transmits a response signal for the signal for discovery to the vicinity of the other UE and the one UE receives the response signal, so that the one UE discovers the other UE.

It is noted that the UE 100 need not necessarily perform the D2D communication even upon discovering a partner terminal. For example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts.

On the other hand, in the above-described case (b), for example, the UE 100-1 starts broadcasting a signal for the D2D communication. Thus, the UE 100 is capable of starting the D2D communication regardless of the existence of the discovery of a partner terminal.

Note that the D2D communication is considered to be performed in a frequency band of the LTE system (that is, in a frequency band of the cellular communication), and for example, in order to avoid interference to the cellular communication, the D2D communication is performed under the control of the network (the eNB 200).

Operation According to Embodiment

Hereinafter, an operation according to the present embodiment will be described.

(1) Operation Overview

Figure 8:
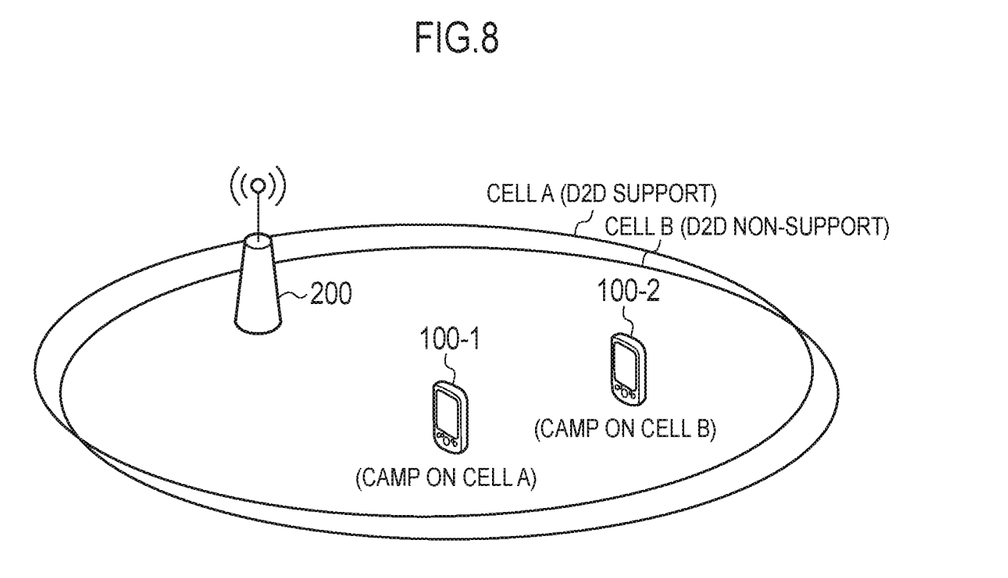
FIG. 8 is a diagram illustrating an operation environment according to an embodiment.

FIG. 8 is a diagram illustrating an operation environment according to the present embodiment.

As illustrated in FIG. 8, the eNB 200 configures a plurality of cells. FIG. 8 illustrates two cells (cell A and cell B). However, the eNB 200 may configure three or more cells. In the plurality of cells, frequency bands (carrier frequencies) are different from one another. Specifically, a frequency band of the cell A is different from a frequency band of the cell B.

The cell A is a cell (a D2D supporting cell) that supports the D2D communication. Thus, the cell A is able to perform management and control of the D2D communication such as a radio resource is assigned to the D2D communication. On the cell A, the UE 100-1 camps. That is, the UE 100-1 is in a state (connection state) in which the UE 100-1 establishes a connection with the cell A, or a state (an idle state) in which the UE 100-1 camps on the cell A.

The cell B is a cell (a D2D non-supporting cell) that does not support the D2D communication. Thus, the cell B is not able to perform management and control of the D2D communication such as a radio resource is assigned to the D2D communication. On the cell B, the UE 100-2 camps. That is, the UE 100-2 is in a state (connection state) in which the UE 100-2 establishes a connection with the cell B, or a state (an idle state) in which the UE 100-2 camps on the cell B.

Here, the situation, in which the UE 100-1 and the UE 100-2 attempt to perform the D2D communication, is assumed. In this case, since the UE 100-1 camps on the D2D supporting cell (the cell A) but the UE 100-2 camps on the D2D non-supporting cell (the cell B), it is not possible to perform the D2D communication.

However, when the UE 100-2 changes a camping cell to the D2D supporting cell (the cell A), it is possible to perform the D2D communication.

In this regard, the eNB 200 transmits D2D information that indicates that the D2D communication is permitted even in the D2D non-supporting cell (the cell B) as well as the D2D supporting cell (the cell A). Specifically, the eNB 200 transmits the D2D information as a part of system information receivable in the UE 100 in the idle state. That is, the eNB 200 transmits the D2D information in a broadcast manner.

When the D2D information is received in the cell A of the eNB 200, the UE 100-1 recognizes that the D2D communication is possible under the control of the eNB 200. When the UE 100-1 receives the D2D information and desires the D2D communication, the UE 100-1 transmits notification information indicating a desire for performing the D2D communication to the eNB 200. Note that when the UE 100-1 is in the idle state at the time point at which the D2D information has been received, the UE 100-1 is transitioned to the connection state in order to transmit the notification information.

When the D2D information is received in the cell B of the eNB 200, the UE 100-2 recognizes that the D2D communication is possible under the control of the eNB 200. When the UE 100-2 receives the D2D information and desires the D2D communication, the UE 100-2 transmits notification information indicating a desire for performing the D2D communication to the eNB 200. Note that when the UE 100-2 is in the idle state at the time point at which the D2D information has been received, the UE 100-2 is transitioned to the connection state in order to transmit the notification information.

When the UE 100-2 is in the connection state in the cell B, the eNB 200 performs handover of the UE 100-2 to the cell A on the basis of the reception of the notification information from the UE 100-2. Then, in the cell A, the D2D communication by the UE 100-1 and the UE 100-2 is started.

(2) Operation Sequence

Figure 9:
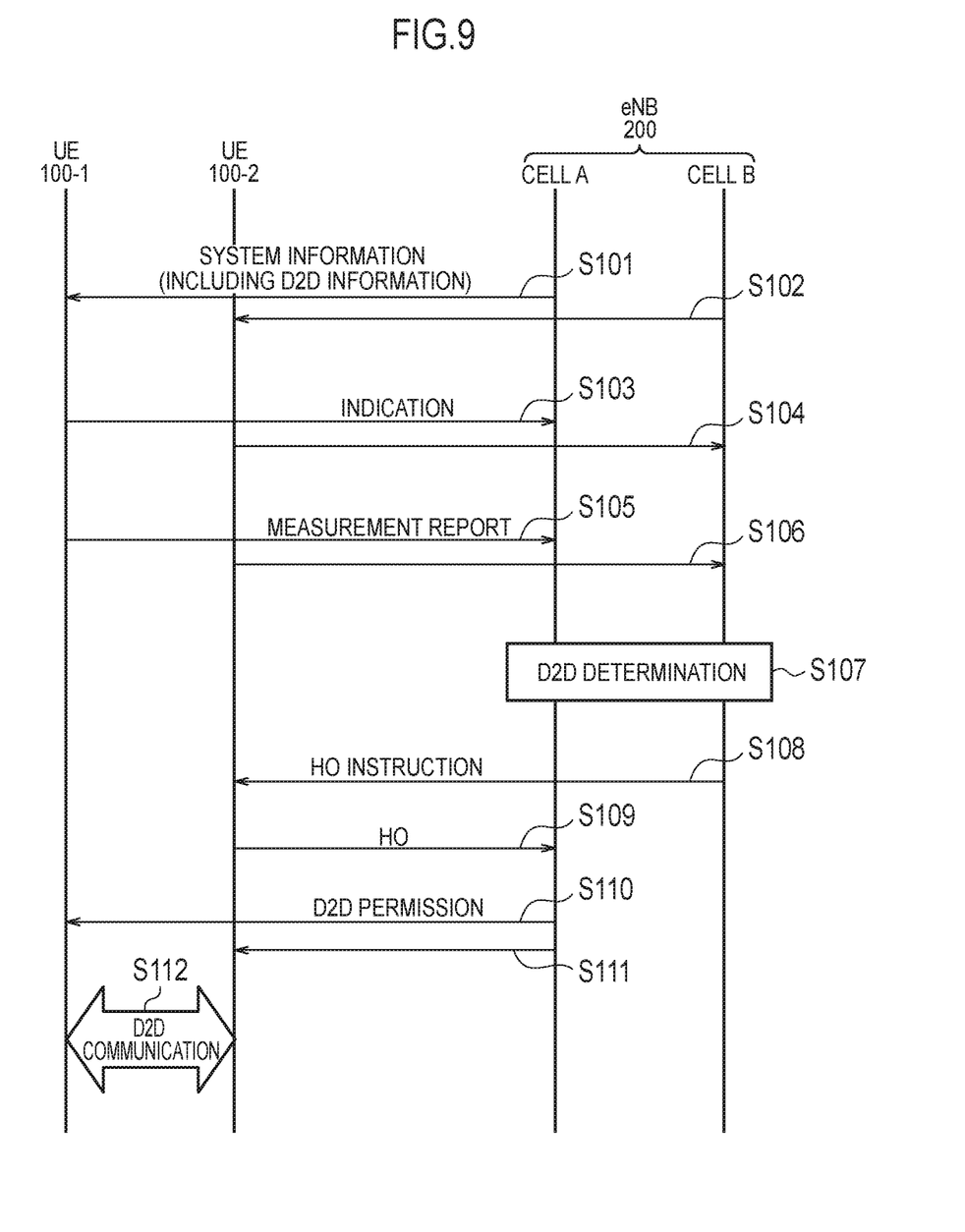
FIG. 9 is an operation sequence diagram according to the embodiment.

FIG. 9 is an operation sequence diagram according to the present embodiment.

As illustrated in FIG. 9, in step S101, the eNB 200 transmits the D2D information, which indicates that the D2D communication is permitted in the cell A that is the D2D supporting cell, as a part of system information. The UE 100-1 receives the D2D information in the cell A and recognizes that the D2D communication is possible under the control of the eNB 200.

In step S102, the eNB 200 transmits the D2D information, which indicates that the D2D communication is permitted in the cell B that is the D2D non-supporting cell, as a part of the system information. The UE 100-2 receives the D2D information in the cell B and recognizes that the D2D communication is possible under the control of the eNB 200.

Note that the system information is transmitted through BCCH that is a kind of a logical channel. A master information block (MIB) of the system information is mapped to BCH that is a kind of a transport channel. A system information block (SIB) of the system information is mapped to DL-SCH that is a kind of a transport channel. The eNB 200, for example, includes the D2D information, which indicates that the D2D communication is permitted, into the SIB, and transmits the SIB.

Hereinafter, a description will be given on the assumption that it is detected that the UE 100-1 and the UE 100-2 are adjacent to each other through the aforementioned discovery process, and it is determined that the UE 100-1 and the UE 100-2 starts the D2D communication.

In step S103, in the cell A, the UE 100-1 transmits notification information (Indication) indicating a desire for performing the D2D communication to the eNB 200.

In step S104, in the cell B, the UE 100-2 transmits notification information (Indication) indicating a desire for performing the D2D communication to the eNB 200.

The notification information (Indication) indicating a desire for performing the D2D communication may include identification information of another UE 100 that is to be a communication partner in the D2D communication. Alternatively, the notification information indicating a desire for performing the D2D communication may also include information indicating a radio resource that is assigned to another UE 100 which is to be a communication partner in the D2D communication, and information indicating a cell on which the other UE 100 camps.

In step S105, the UE 100-1 transmits a reception state report (Measurement report) to the eNB 200. The radio state report includes information indicating a measurement result of a reception state of a reference signal received in the UE 100-1 in the cell A. Such a measurement result, for example, indicates reference signal received power (RSRP) and reference signal received quality (RSRQ).

In step S106, the UE 100-2 transmits a reception state report (Measurement report) to the eNB 200. The radio state report includes information indicating a measurement result of a reception state of the reference signal received in the UE 100-2 in the cell B. Such a measurement result, for example, indicates reference signal received power (RSRP) and reference signal received quality (RSRQ).

In step S107, the eNB 200 determines whether to permit the D2D communication by the UE 100-1 and the UE 100-2 on the basis of radio states corresponding to each of the UE 100-1 and the UE 100-2. For example, when the received power of the reference signals received in each of the UE 100-1 and the UE 100-2 is high, the eNB 200 may reject the D2D communication in order to avoid interference to cellular communication from the D2D communication. Hereinafter, a description will be given on the assumption that the eNB 200 permitted the D2D communication.

In step S108, the eNB 200 transmits an instruction of handover (HO) to the cell A, which is the D2D supporting cell, to the UE 100-2 in a connection state in the cell B that is the D2D non-supporting cell.

In step S109, the UE 100-2 performs handover to the cell A from the cell B in response to the handover instruction.

In step S110, the eNB 200 transmits, to the UE 100-1, notification (D2D permission) indicating that the D2D communication is permitted in the cell A. Furthermore, the eNB 200 may control D2D assignment resource information, which indicates a radio resource that is assigned to the D2D communication by the UE 100-1 and the UE 100-2, to be included into the notification (D2D permission), and transmit the notification.

In step S111, the eNB 200 transmits, to the UE 100-2, the notification (the D2D communication permission) indicating that the D2D communication is permitted. Furthermore, the eNB 200 may control the D2D assignment resource information, which indicates the radio resource that is assigned to the D2D communication by the UE 100-1 and the UE 100-2, to be included into the notification (D2D permission), and transmit the notification.

In step S112, in the cell A, the UE 100-1 and the UE 100-2 perform the D2D communication by using the radio resource assigned by the eNB 200.

As described above, according to the present embodiment, the UE 100-2 camping on the D2D non-supporting cell is also able to notify the base station of a desire for performing the D2D communication, so that the D2D communication is possible.

Other Embodiments

Thus, the present disclosure has been described with the embodiments. However, it should not be understood that those descriptions and drawings constituting a part of this disclosure limit the present disclosure. From this disclosure, a variety of alternate embodiments, examples, and applicable techniques will become apparent to one skilled in the art.

For example, the UE 100-1 or the UE 100-2 may perform communication (specifically, communication of a control plane) with the eNB 200 as a representative of a UE group (the UE 100-1 and the UE 100-2), which is an object of the D2D communication. The UE 100 performing the communication with the eNB 200 as a representative for the purpose of the D2D communication is called "anchor UE". In this case, it is sufficient if the processes (that is, the notification of the D2D permission) in steps S110 and S111 in FIG. 9 are performed only for the anchor UE by the eNB 200.

The aforementioned embodiment has described an example in which the D2D information, which indicates that the D2D communication is permitted, is transmitted as a part of the system information. However, the present disclosure is not limited to the case in which the D2D information is transmitted in the broadcast manner. For example, the D2D information may be transmitted in a unicast manner.

The aforementioned embodiment does not particularly consider a heterogeneous environment in which a lower power base station (a pico base station or a femto base station) is arranged. However, in the heterogeneous environment, it is preferable to select a handover destination in consideration of the influence of interference to the lower power base station from the D2D communication.

Figure 10:
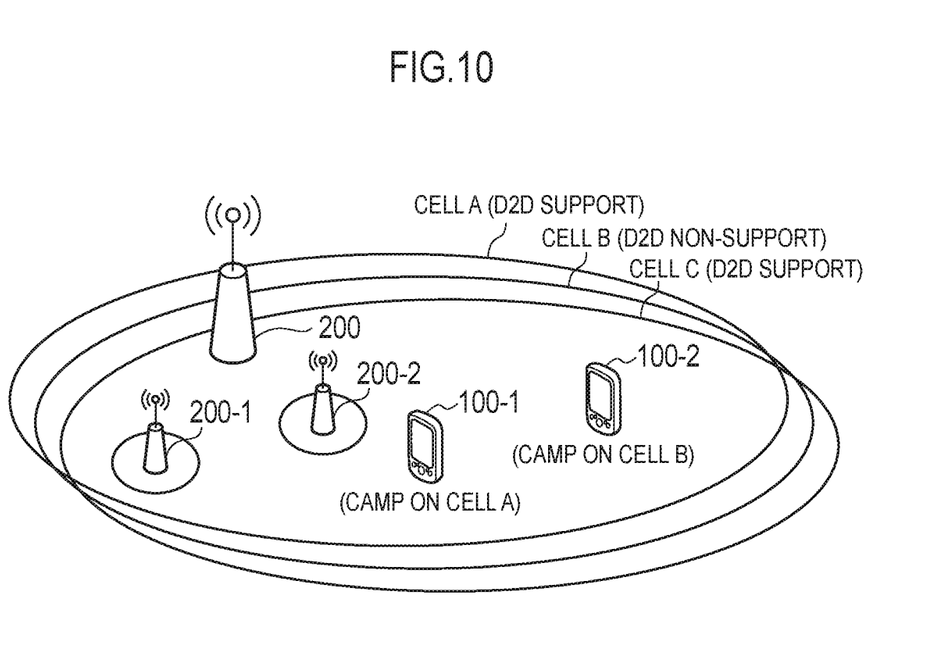
FIG. 10 is a diagram illustrating a communication environment according to another embodiment.

FIG. 10 is a diagram illustrating a communication environment according to another embodiment. As illustrated in FIG. 10, the eNB 200 configures three cells. The cell A and a cell C indicate cells (D2D supporting cells) that support the D2D communication. On the cell A, the UE 100-1 camps. The cell B is a cell (a D2D non-supporting cell) that does not support the D2D communication. On the cell B, the UE 100-2 camps.

Moreover, lower power base stations 200-1 and 200-2 are arranged in an overlapping area of each of the cells. Each of the lower power base stations 200-1 and 200-2 configures a small cell. A description will be given on the assumption that a frequency band of the small cell overlaps a frequency band of the cell A.

In such a communication environment, when notification information (Indication) indicating a desire for performing the D2D communication has been received from each of the UE 100-1 and the UE 100-2, the eNB 200 determines the cell C as a handover destination such that the D2D communication is performed in a cell (the cell C) in which frequency bands of the D2D supporting cells (the cell A and the cell C) do not overlap the frequency band of the small cell.

In this case, after the eNB 200 transmits a handover instruction to the cell C to each of the UE 100-1 and the UE 100-2 and the UE 100-1 and the UE 100-2 perform handover to the cell C, the eNB 200 transmits D2D permission to each of the UE 100-1 and the UE 100-2.

In the aforementioned embodiment, the eNB 200 performs control relevant to the D2D communication; however, this configuration is not restrictive. For example, an upper network node (such as the MME) constituting the core network performs the control relevant to the D2D communication instead of the eNB 200. Thus, the network node may instruct the eNB 200 to transmit D2D information indicating that the D2D communication is permitted in the cell B being the D2D non-supporting cell. As described above, a network device such as the eNB 200 and the MME performs the control relevant to the D2D communication.

In addition, the aforementioned embodiment has described an example in which the present disclosure is applied to the LTE system. However, the present disclosure may also be applied to systems, other than the LTE system, as well as the LTE system.

INDUSTRIAL APPLICABILITY

As described above, the mobile communication system, the user terminal, the base station, the processor and the mobile communication method according to the present disclosure are capable of appropriately controlling the D2D communication, and thus they are useful in a mobile communication filed.

The invention claimed is:

1. A mobile communication system, comprising a plurality of cells, wherein
the plurality of cells includes:
a device-to-device (D2D) supporting cell that supports D2D communication in which data communication is directly performed between user equipments; and
a D2D non-supporting cell that does not support the D2D communication, the D2D supporting cell and the D2D non-supporting cell conforming with long term evolution (LTE) standards and supporting LTE cellular communication, and
the mobile communication system further comprises:
at least one base station configured to include the D2D non-supporting cell and the D2D supporting cell; and
a user equipment configured to:
receive a system information block (SIB) from the D2D non-supporting cell not assigning radio resources for the D2D communication, the SIB indicating that the D2D communication to be performed by the user equipment is permitted in the at least one base station;
transmit notification information to the at least one base station in response to receiving the SIB from the D2D non-supporting cell, the notification information indicating an interest in performing the D2D communication by the user equipment;
in case that the user equipment is in an idle state, transition to a connected state to transmit the notification information in response to receiving the SIB from the D2D non-supporting cell; and
transmit a measurement report to the at least one base station, and
the at least one base station is further configured to perform handover of the user equipment from the D2D non-supporting cell to the D2D supporting cell, based on the measurement report, after receiving the notification information from the user equipment.

2. The mobile communication system according to claim 1, wherein the notification information includes identification information identifying another user equipment to be a communication partner of the user equipment in the D2D communication.

3. The mobile communication system according to claim 1, wherein the measurement report includes a result of a reception state of reference signal received by the user equipment, the result of a reception state is indicated by reference signal received power (RSRP) and reference signal received quality (RSRQ).

4. A base station for a mobile communication system, which includes a plurality of cells, wherein
the plurality of cells includes:
a device-to-device (D2D) supporting cell that supports D2D communication in which data communication is directly performed between user terminals; and
a D2D non-supporting cell that does not support the D2D communication, the D2D supporting cell and the D2D non-supporting cell conforming with long term evolution (LTE) standards, and
the base station comprises a control unit configured to:
include the D2D non-supporting cell;
transmit a system information block (SIB) from the D2D non-supporting cell not assigning radio resources for the D2D communication, the SIB indicating that the D2D communication to be performed by a user terminal is permitted in the base station;
receive notification information from the user terminal that transmits the notification information in response to receiving the SIB from the D2D non-supporting cell, wherein the notification information indicates an interest in performing the D2D communication by the user terminal;
receive a measurement report from the user terminal; and
perform handover of the user terminal from the D2D non-supporting cell to the D2D supporting cell, based on the measurement report, after receiving the notification information from the user terminal.

5. A processor for a user terminal for a mobile communication system, which includes a plurality of cells, wherein
the plurality of cells includes:
a device-to-device (D2D) supporting cell that supports D2D communication in which data communication is directly performed between user terminals; and
a D2D non-supporting cell that does not support the D2D communication, the D2D supporting cell and the D2D non-supporting cell conforming with long term evolution (LTE) standards and supporting LTE cellular communication,
the processor is configured to perform processes of:
receiving, from the D2D non-supporting cell of a base station not assigning radio resources for the D2D communication, a system information block (SIB), the SIB indicating that the D2D communication to be performed by the user terminal is permitted in the base station,
transmitting notification information to the base station in response to receiving the SIB from the D2D non-supporting cell, the notification information indicating an interest in performing the D2D communication by the user terminal;
in case that the user terminal is in an idle state, transitioning to a connected state to transmit the notification information in response to receiving the SIB from the D2D non-supporting cell;
transmitting a measurement report to the base station, and
performing handover of the user terminal from the D2D non-supporting cell to the D2D supporting cell, based on an instruction from the base station.

6. A user terminal comprising the processor according to claim 5.

* * * * *